United States Patent [19]

Coleman

[11] Patent Number: 4,494,117

[45] Date of Patent: Jan. 15, 1985

[54] DUAL SENSE, CIRCULARLY POLARIZED HELICAL ANTENNA

[75] Inventor: H. Paris Coleman, Alexandria, Va.

[73] Assignee: The United States of America as represented by the Secretary of the Navy, Washington, D.C.

[21] Appl. No.: 399,519

[22] Filed: Jul. 19, 1982

[51] Int. Cl.$^3$ .............................................. H04B 7/00

[52] U.S. Cl. .................................... 343/365; 343/895

[58] Field of Search ............... 343/365, 371, 895, 447; 343/365

[56] References Cited

U.S. PATENT DOCUMENTS

| | | | |
|---|---|---|---|
| 3,039,099 | 6/1962 | Chait et al. | 343/895 X |
| 3,283,332 | 11/1966 | Nussbaum | 343/895 |
| 3,383,695 | 5/1968 | Jarek | 343/895 |
| 3,757,345 | 9/1973 | Carver | 343/895 X |
| 3,820,118 | 6/1974 | Hall | 343/895 X |
| 4,012,744 | 3/1977 | Greiser | 343/895 |
| 4,014,028 | 3/1977 | Cone et al. | 343/895 |
| 4,117,488 | 9/1978 | Perrotti | 343/365 |
| 4,427,984 | 1/1984 | Anderson | 343/895 X |

OTHER PUBLICATIONS

Stinehelfer, Industrial Microwave, Jun. 1955 Electronic, FIG. 1, p. 165.

*Primary Examiner*—Maynard R. Wilbur
*Assistant Examiner*—Brian Steinberger
*Attorney, Agent, or Firm*—Robert F. Beers; William T. Ellis; Charles E. Krueger

[57] ABSTRACT

A helical antenna for radiating waves in both orthogonal states of circular polarization that is fed at the base by a first feed and at the tip by a second feed. The amplitude and phase of the signal from the first feed controls the amplitude and phase of the wave in the first orthogonal polarization while the amplitude and phase of the second signal from the second feed independently controls the amplitude and phase of the wave in the second polarization state. Radiated waves of any arbitrary polarization state are formed by adjusting the amplitude and phase of the feed signal. Alternative embodiments are disclosed and claimed.

9 Claims, 4 Drawing Figures

DUAL SENSE, CIRCULARLY POLARIZED HELICAL ANTENNA

BACKGROUND OF THE INVENTION

The invention relates to antennas in general, and more particularly to antennas for radiating waves with orthogonal states of polarization.

There is a significant class of applications which require the transmission and reception of radiation characterized by two orthogonal states of polarization or linear combinations thereof. For example, in communication systems with narrow bandwidth requirements the number of communication channels may be doubled by utilizing the two orthogonal polarization states present at each frequency as carriers. Also, many electronic warfare applications require duplication of the polarization state of received signals.

Prior art dual-mode antennas generally combine orthogonal linear modes of polarization. However, for applications utilizing circular polarization, such as rain clutter reduction, it is more efficient to generate the circular modes directly. Prior art waveguide antennas capable of simultaneously emitting radiation in both circular polarization states exist, but these antennas are generally characterized by low dimensional tolerances and by narrow bandwidths.

SUMMARY OF THE INVENTION

Accordingly, one object of the invention is to provide a new and useful antenna for emitting radiation in both circular polarization states or any linear combination of orthogonal circularly polarized states.

It is a further object of the present invention to provide a dual-mode antenna with a wide bandwidth.

It is still a further object of the present invention to provide a dual-mode antenna not characterized by low dimensional tolerances.

These and other objects are readily achieved in accordance with the present invention wherein a helical antenna is fed at its base and tip by two feed lines carrying microwave signals with arbitrary amplitudes and relative phases. The antenna emits forward radiation characterized by either or both orthogonal states of circular polarization. The amplitude and phase of the radiation in each polarization state is controlled by the amplitude and phase of the microwave signals fed to the antenna. The dimensions of a helical antenna are not highly critical so that low dimensional tolerances are not required.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Briefly, every electromagnetic wave comprises perpendicular, time-varying electric and magnetic field vectors. Generally the direction of the electric field is the direction of polarization of the wave. If the orientation of the electric field vector is constant, then the wave is linearly polarized. If the electric field vector rotates, then the wave is circularly or elliptically polarized depending on whether the magnitude of the electric field is constant or changing. The direction of rotation may be clockwise or counterclockwise with the corresponding states of circular polarization designated right handed or left handed respectively. Since no combination of right handed polarized waves can create a left handed wave, or vice versa, the two states are orthogonal. Also, since any arbitrary linear, elliptical or circularly polarized wave can be formed by linear combinations of left handed and right handed polarized waves, the states of circular polarization form a basis spanning the complete set of possible polarization states.

In the discussion that follows the actual sense of polarization is not critical. Therefore the states of circular polarization are referred to as the first state and the second state.

The present invention is based on the use of a helical-type antenna as noted previously. A helical antenna generally includes a ground plane and a wire helix. If the antenna element is fed at the end near the ground plane (the base), then it will radiate a first wave, in the first state of circular polarization, propagating along the axis of the helix in the direction away from the ground plane. It has been discovered that if the wire helix is fed at the tip (the end of the helix opposite the ground plane) a second wave of the first circular polarization state is emitted propagating toward the ground plane. The second wave will be reflected by the ground plane thereby changing from the first polarization state to the second polarization state. Thus a third wave, of the second state of circular polarization will propagate in the same direction as the first wave. As described more fully below, the amplitudes and phases of the first and third waves can be independently varied so that a wave with any arbitrary state of polarization can be emitted by the antenna.

Figure 1:
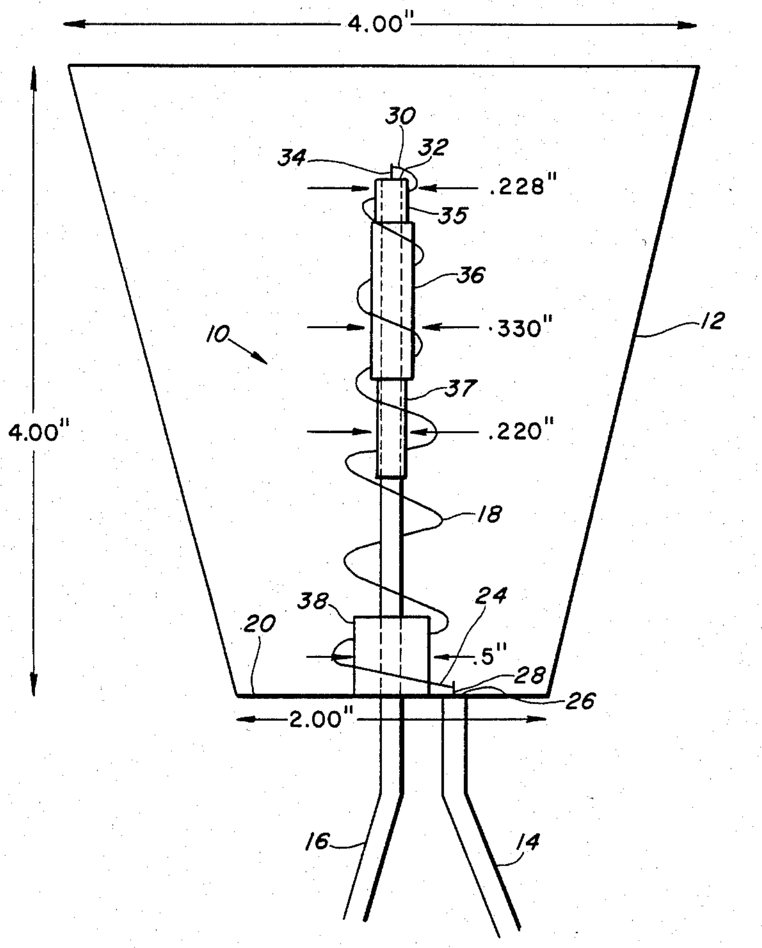
FIG. 1 is a cross-sectional view of one embodiment of the present invention.

Turning now to FIG. 1, an embodiment of the present invention is illustrated. A helical antenna element 10 within a conical horn 12 is fed at both ends by co-axial tranmission lines 14,16. The helical antenna element and the conical horn have a common axis of symmetry.

The helical antenna element includes a wire wound in the shape of a helix 18 and a metal sheet designated the ground plane 20. For the embodiment illustrated in FIG. 1 the ground plane is the metal base of the conical horn 12.

The axis of the helix forms a reference for defining the intensity pattern of the radiation emitted by the helical antenna element. The axial radiation emitted by the antenna in the direction away from the ground plane 20 is designated forward radiation while axial radiation emitted toward the ground plane 20 is designated backward radiation.

The helical antenna element 10 is characterized by D and C, the diameter and circumference respectively of an imaginary cylinder enclosing the wire helix where $C=\pi D$; by S, the center to center spacing between turns of the helix; by $\alpha$, the pitch angle of the helix where $\alpha$=arc tan $S/\pi D$; by n, the number of turns of the helix; and by L, the axial length of the helix where L=nS. In actual practice some of the above-described parameters may vary over the length of the helical antenna element 10.

The helix of the present invention is formed with the loop circumference, C, approximately equal to the free space wavelength, $\lambda$, of the radiation emitted by the antenna element. The emitted radiation pattern is strongly peaked along the helical axis in the forward direction. This mode of radiation is denoted the axial mode with the emitted radiation being circularly polarized where the state of circular polarization of the emitted radiation is determined by the winding direction of the helix 18. The theory and operating characteristics of helical antennas are set forth in the book by J. D. Kraus entitled *Antennas,* McGraw-Hill, New York, 1950, pp. 173–216.

The conical horn with a base plate, which functions as the ground plane 20, attached to a metal cone of approximately the same length as the helical antenna element 10 increases the forward directivity of the radiation pattern. Characteristics of helical antennas within conical horns are set forth in the article by Keith R. Carver entitled "The Helicone—A Circularly Polarized Antenna with Low Sidelobe Level", Proc. IEEE, Vol. 55, No. 4, April 1967, p. 559.

The helix 18 is fed at the base 24, the end nearest the ground plane 20, by a first coaxial cable 14 with its outer conductor 26 terminating at and electrically connected to the ground plane and with its inner conductor 28 soldered to the base 24 of the helix 18. The helix 18 is also fed at the tip 30, the end farthest from the ground plane 20, by a second co-axial cable 16 passing through the ground plane 20 and positioned along the axis of the helix 18. The outer conductor 32 of the second co-axial cable 16 terminates near the tip 30 of the helix 18 and the inner conductor 34 is soldered to the tip 30 of the helix 18.

When a microwave signal is fed to the antenna by the first co-axial cable 14 the antenna radiates a first circularly polarized axial wave in the forward direction. It has been discovered, however, that if a signal is fed to the tip of the helical antenna element by the second coaxial cable 16 a backward axial wave is radiated with same state of polarization as the first forward wave. The backward wave is then reflected by the ground plane 20 so that its state of polarization is reversed and a second forward wave results with the opposite state of polarization from the first forward wave.

FIG. 1 includes the dimensions of an embodiment of the invention actually reduced to practice. It is to be understood that the dimensions included are exemplary only and do not limit the scope of the invention. Note that the helical antenna element 10 is tapered so that D varies from about 0.75 inches at the base to about 0.4 inches at the tip. The interloop spacing, S, is about 0.52 inches while the pitch angle, $\alpha$, is about 12° for the first turn then increases to about 14° therafter. The number of turns, n, is $6\frac{1}{2}$.

The helix is formed from 0.060 inch copper wire while the feeds are 0.141 inch co-axial cable. The conical horn has a 2 inch base, a 4 inch opening and is 4 inches high. Note that the connecting point of the first co-axial cable to the base of the conical horn is slightly displaced from the helical axis.

The thickness of the outer conductor 32 of the second co-axial cable 16 has been increased so that the impedance terminating the first and second co-axial cables is equal thereby causing the amplitude of the inward wave to equal that of the first outward wave. This thickness increase compensates for the lack of a ground plane at the tip 30 of the helical antenna element and is achieved by positioning conducting sleeves 35,36,37,38 of various thicknesses over the second co-axial cable 16 near the tip of the helix 18. The actual diameters of the sleeves 35,36,37,38 utilized are set forth in FIG. 1.

The actual antenna constructed radiates in the axial mode for frequencies between about 4–8 GHz although actual testing was carried out at 5060 MHz.

Figure 2:
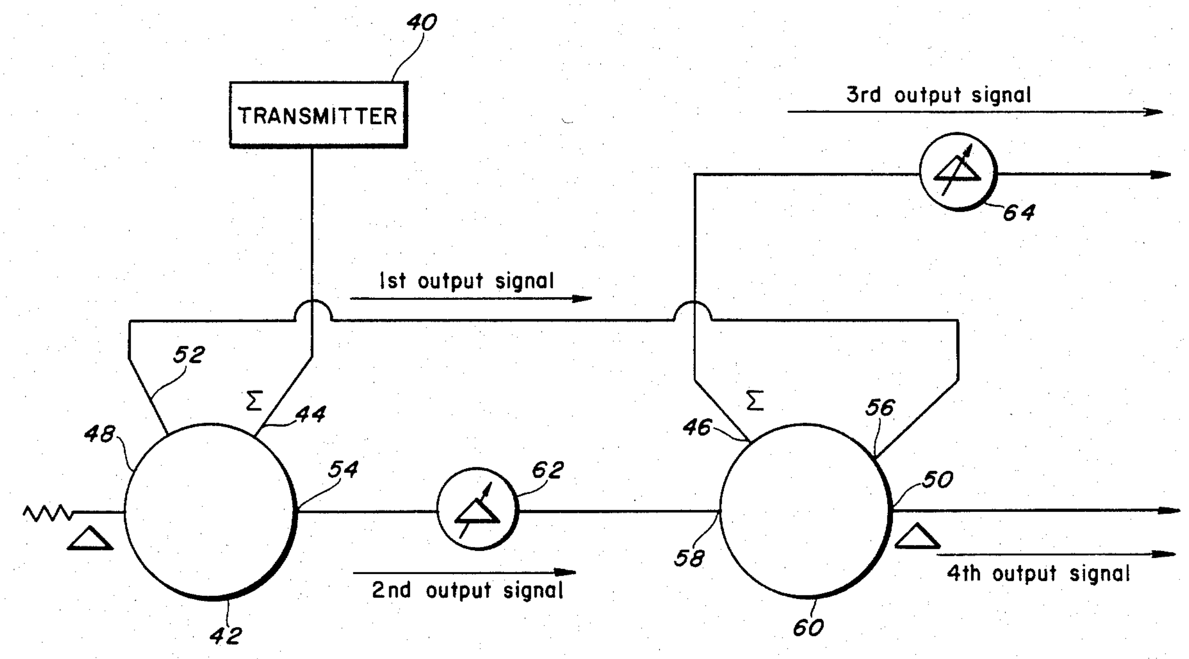
FIG. 2 is a schematic diagram of a circuit for providing input signals to the embodiment of FIG. 1.

The amplitude and phase of the first outward wave is controlled by the amplitude and phase of the signal fed to the base of the antenna by the first co-axial feed line. Similarly, the amplitude and phase of the second outward wave is controlled by the signal in the second co-axial cable. Since the first and second waves are oppositely polarized, an outward wave with any arbitrary state of polarization may be achieved by linearly combining the first and second outward waves. FIG. 2 is a schematic diagram of a circuit for creating a pair of feed signals with arbitrary amplitude and phase differences from the output signal of a transmitter. The feed signals are fed to the antenna by the first and second co-axial cables. The circuit utilizes rat races and phase shifters which are well-known microwave line components described in the book by Reich et al. entitled *Microwave Theory and Technique,* Van Nostrand, New York, 1953.

Turning now to FIG. 2 the output signal from a transmitter is fed to the sum port of a first rat race 42. Each rat race has a sum port ($\Sigma$)44,46, a difference port ($\Delta$)48,50, and two auxiliary ports 52,54,56,58. If two signals with equal phase and with amplitudes $S_1$ and $S_2$ are fed to the auxiliary ports of a rat race, then the amplitude of the output at $\Sigma$ is $S_1+S_2$ while the amplitude of the output signal at $\Delta$ is $S_1-S_2$. However, if an input signal is fed to the $\Sigma$ port with amplitude $S_3$, the output signals from the auxiliary ports will both have equal amplitudes, $\sqrt{1}S_3$, and equal phase. Thus, the transmitter output signal fed to the $\Sigma$ port 44 is transformed into two equal signals, a first output signal and a second output signed at the auxiliary ports 52,54 of the first rat race 42.

The first and second output signals are fed to auxiliary ports 56,58, of a second rat race 60 and a first variable phase shifter 62 is placed in the line transmitting the second output signal. The output from the $\Sigma$ port 46 of the second rat race 60 is designated the third output signal while the output from the $\Delta$ port 50 is disignated the fourth output signal. Since the amplitudes of the first and second output signals are equal, the amplitude of the third and fourth signals is dependent on the relative phase difference between the first and second output signals at the auxiliary ports 58,56 of the second rat race 60. If this phase difference is adjusted to zero, then the amplitude of the third output signal is $S_3$ and the amplitude of the fourth output signal is 0. If this phase difference is equal to $\pi$, then it the amplitude of the third output signal is zero and the amplitude of the fourth output signal is $S_3$. Thus, by adjusting the phase difference between the first and second output signals the relative amplitudes of the third and fourth output signals from the second rat race may be adjusted to any desired value.

A second phase shifter 64 is placed in the line transmitting the fourth output signal thereby providing for the adjustment of the relative phase between the third and fourth output signals. The third and fourth output signals are then fed to the helical antenna element by the first and second co-axial cables 14,16.

Figure 3A:
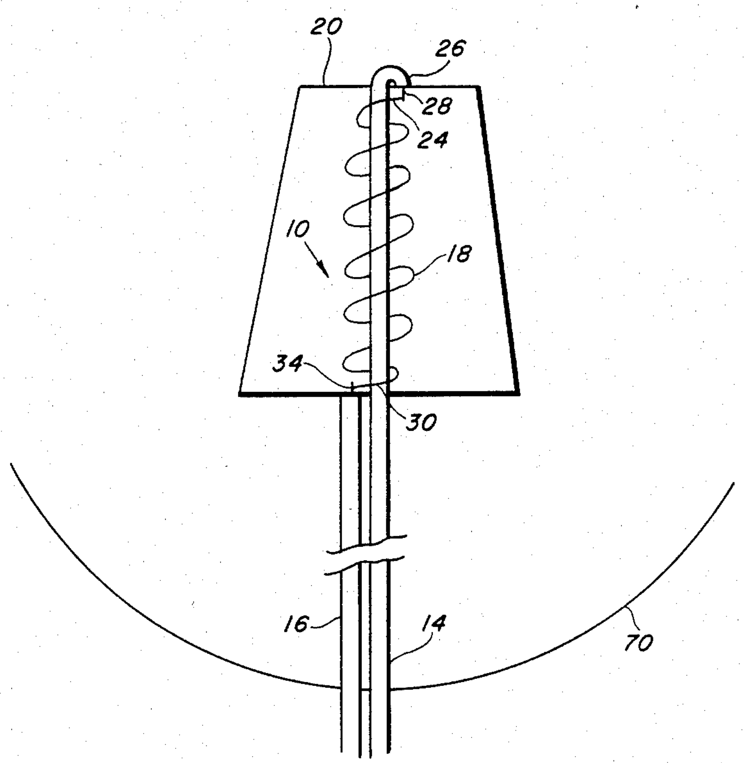
FIG. 3*a* is a cross-sectional view of a first embodiment of the present invention utilizing a reflector.
Figure 3B:
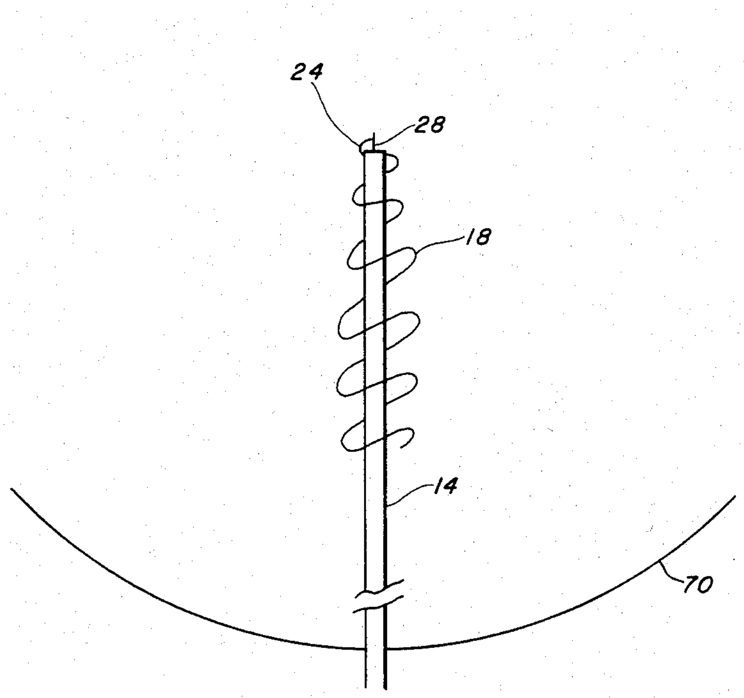
FIG. 3*b* is a cross-sectional view of second embodiment of the invention utilizing a reflector.

The antenna element described herein may be modified to form a vertex feed for a reflector type antenna. FIG. 3*a* and 3*b* are schematic diagrams of exemplary embodiments.

Turning now to FIG. 3*a*, the helical antenna element 10 is positioned at the focus of the reflector element 70 and oriented so that forward radiation is reflected from the reflector vertex. The first co-axial cable 14 is positioned along the helical axis with its outer conductor 26 terminating at the ground plane 20 and its inner conductor 28 soldered to the base 24 of the helix 18. The second co-axial cable 16 is adjacently positioned to the first co-axial cable 14 but terminates at the tip of 30 of the helix 18 with inner conductor 34 soldered to the tip 30.

Alternatively, the helical antenna element at the focus of the reflector element may be fed by only the first co-axial cable 14 as illustrated in FIG. 3*b*. This embodiment is a very simple means for providing circularly polarized feed radiation for a reflector type antenna, but since the helical antenna element is fed by only one co-axial cable, only one state of circular polarization may be radiated.

Although the operation of the helical antenna has been described for use in the transmission of radiation it is well understood by a person of ordinary skill in the art that the antenna will also function as a receiver of radiation due to the Reciprocity Theorem.

If the received radiation includes waves in both the first and second polarization states the amplitude and phase of the signal in the first co-axial cable will correspond to the amplitude and phase of the wave of the first polarization state while the amplitude and phase of the signal in the second co-axial cable will correspond to the amplitude and phase of the wave of the second polarization state.

The present invention may be used in all existing systems utlizing helical antenna elements but will upgrade the performance of such systems by providing the capability of transmitting or receiving radiation in both circular polarization states or any combination thereof.

Transmission lines other than co-axial cables may be used as feed lines. Alternatives include strip-line or tri-plate lines. Additionally, multifilar helical antenna elements, as described, for example, in U.S. Pat. No. 3,503,075, may be substituted for the simple helical antenna element described herein.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An orthogonal-mode antenna comprising:

antenna means for transmitting or receiving circularly polarized radiation of a first circular polarization state;

first feed means, electrically coupled to said antenna means, for driving said antenna means to emit a first wave in the first state of circular polarization wherein said first wave propagates with maximum intensity in the direction of a first propagation vector;

second feed means, electrically coupled to said antenna means, for driving said antenna means to emit a second wave in the first state of circular polarization wherein said second wave propagates with maximum intensity in the direction of a second propagation vector;

reflecting means for reflecting said second wave in the direction of said first propagation vector so that the state of circular polarization of said reflected second wave changes from the first state to a second state of circular polarization.

2. An orthogonal-mode antenna comprising: a helical antenna element for transmitting or receiving circularly polarized radiation of a first circular polarization state;

first feed means, electrically coupled to said antenna element, for driving said antenna element to emit a first wave in the first state of circular polarization wherein said first wave propagates with maximum intensity in the direction of a first propagation vector;

second feed means, electrically coupled to said antenna element, for driving said antenna element to emit a second wave in the first state of circular polarization wherein said second wave propagates with maximum intensity in the direction of a second propagation vector;

reflecting means for reflecting said second wave in the direction of said first propagation vector so that the state of circular polarization of said reflected second wave changes from the first state to a second state of circular polarization.

3. The antenna recited in claim 2 wherein: said feed means are transmission lines with a first and second conductor.

4. The antenna recited in claim 3 wherein:

said reflecting means is a metal plate adjacently disposed to said helical antenna element.

5. The antenna recited in claim 3 further comprising:

a metal cone with said helical antenna element positioned within said cone.

6. The antenna recited in claim 5 further comprising:

reflector means for reflecting radiation wherein said wire helix is positioned at the vertex of said reflector means.

7. An orthogonal mode helical antenna comprising:

a helical antenna element with a base and a top;

a ground positioned at the base of said helical antenna element;

a first feed line that is a co-axial cable terminating at said ground plane and electrically coupled to the base of said helical antenna element;

a second feed line that is a co-axial cable passing through said ground plane and terminating at the top of said helical antenna element and electrically connected thereto wherein said second feed line is substantially aligned along the axis of symmetry of said helical antenna element;

and a metal cone with its narrow end attached to said ground plane and with said helical antenna element positioned within said metal cone wherein said metal cone and said helical antenna element have a common axis of symmetry.

8. An antenna as recited in claim 1, wherein the antenna means has a tip and a base and wherein said first feed means is electrically coupled to antenna means at said antenna means base; and wherein said second feed means is electrically coupled to said antenna means at said antenna means tip.

9. An orthogonal-mode antenna as recited in claim 2, wherein the orthogonal-mode antenna element has a tip and a base and wherein said first feed means is electrically coupled to said orthogonal-mode antenna element at said orthogonal-mode antenna element base; and wherein said second feed means is electrically coupled to said orthogonal-mode antenna element at said orthogonal-mode antenna element tip.

* * * * *